Aug. 21, 1928.

O. BÖHM 1,681,568

ARRANGEMENT FOR GOVERNING SPEED OF ASYNCHRONOUS MOTORS

Filed Sept. 24, 1924    2 Sheets-Sheet 1

Inventor
OTTO BÖHM

By his Attorney

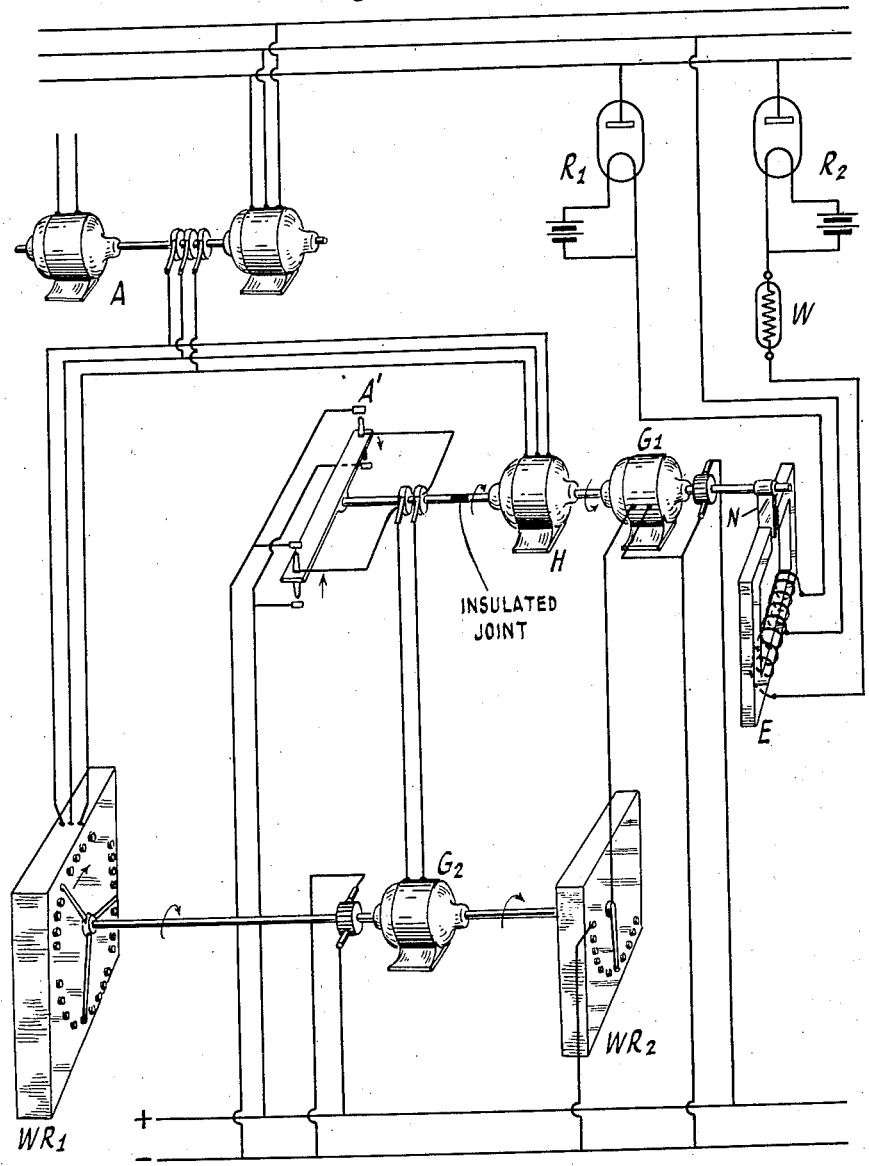

Patented Aug. 21, 1928.

1,681,568

UNITED STATES PATENT OFFICE.

OTTO BÖHM, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY.

ARRANGEMENT FOR GOVERNING SPEED OF ASYNCHRONOUS MOTORS.

Application filed September 24, 1924, Serial No. 739,456, and in Germany September 25, 1923.

My invention relates to an arrangement for governing the speed of asynchronous motors, and it has for its object to provide such an arrangement which will be sensitive and will take care of variations in both the frequency and the voltage of the line supplying the driving motor and also variations in the load on the driving motor.

Very high demands are often made in radio practice with regard to the speed constancy of asynchronous alternating current motors, for instance, of those driving high frequency generators. The simplest, and an often employed solution of this problem is to provide any speed governor which alters the resistance of the rotor circuit of the asynchronous motor as soon as the speed of the motor differs from the normal speed. Every arrangement based upon this principle has, however, two considerable disadvantages: first, only after the speed has altered to a certain appreciable extent this arrangement starts to function; and second, it can not precisely adjust the correcting impulse of force released by it according to the strength of the cause effecting the alteration of speed.

It is much more effective if the regulation of the resistance of the rotor does not depend on the alteration of speed after the speed has changed, but directly on the setting in of the cause of the speed alteration, in such a way that the generated counter effect compensates the cause as completely as possible. Only the minor deviations in speed remaining from the cumulative effects of the previously described regulating means need then be provided for in order to obtain extremely accurate speed regulation, and an additional governor for producing these last minor corrections by an influence on the rotor resistance may be provided.

The speed variations are principally caused by variations in the load on the driven machine, and by frequency and voltage variations of the line supplying the driving motor. It is known that the rhythmical alterations of the load on the high frequency generator, caused by the transmission of wireless signals which influence the speed of the machine, may be compensated for by alternately short circuiting and including resistances in the rotor circuit of the motor in the rhythm of the signals, by means of suitable relays, controlled by the key itself, so that the same slip from synchronous speed of the supply current is always attained. The effects of the fluctuations of the voltage of the system were until the present compensated solely by the speed governor.

The principle of the present invention is also to directly compensate these disturbances of the equilibrium.

Of all the irregularities of the power supply source, the variation of the frequency has the greater influence, because alterations of the synchronous revolutions of the motor field by a small percent cause multiplied alterations of the slip of the rotor driven thereby. These alterations of the slip require proportional alterations of the resistance of the rotor circuit in order to maintain constant speed and otherwise equivalent relations. So the problem is to alter the resistance of the rotor proportionally to the slip corresponding to the respective frequency of the supply line.

According to the invention a small asynchronous auxiliary motor is supplied with current by the slip rings of the main driving asynchronous motor. The field of the auxiliary motor remains constant because the impressed voltage (as slip voltage of the main motor) is proportional to the slip frequency, and the impedance is also proportional to the slip frequency so, therefore, the design can be arranged so that the current through the stator of the auxiliary motor is constant. On the other hand, the speed of rotation of this constant field is proportional to the slip in the main motor so that a current, proportional to the slip is generated in the stationary rotor. The rotative moment or torque developed thereby, that is, the product of rotor current and field, is then also proportional to the slip.

If this motor torque is counteracted by a rotative moment which is proportional to the resistance inserted in the rotor circuit of the main motor, the motor remains at rest if the resistances are properly dimensioned and the regulator suitably adjusted corresponding to the slip. If the regulator is driven directly by the motor or by means of a gearing, it is always brought back to balance in case the frequency of the line supplying the main motor alters, because it is driven in one or the other direction according to whether the rotative moment of the motor or the counter rotative moment prevails.

If one does not wish to let the auxiliary motor itself rotate, it can be used as a relay in such a way that it makes a special driving motor of the regulator run in one or the other direction by closing and opening contacts, and stop after the right position of the regulator is attained.

The counter revolving moment, which must act upon the auxiliary motor and be proportional to the included resistance, can be obtained in different ways, as shown by the drawing in which:

Figure 2 shows a preferred embodiment of my invention designed for especial critical speed control.

Fig. 1 shows, for instance, the accomplishment of this counter rotative moment in a mechanical manner.

Figure 1:
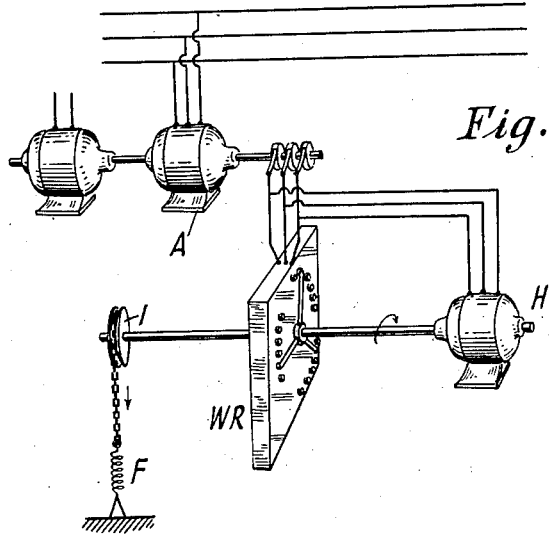
Figure 1 shows one embodiment of my invention in which counter rotative moment is furnished by mechanical means.

In this figure A is the asynchronous main motor and H the auxiliary asynchronous motor which is supplied with current by the slip rings of the main motor. The movable contacting arms of a regulating resistance WR are fastened on the shaft of the auxiliary motor H. A spring F or a weight acts upon the regulator by means of a pulley 1. This is necessary to provide a restoring force when the speed deviates in a reverse direction. In Fig. 1 a spring, chain, and pulley combination is shown. Alternatively a direct current motor $G^1$ providing a torque in the reversed direction may be utilized, and means provided whereby its torque is changed in accordance with the deviation from the mean position. This may be done by the rheostat $WR_2$ shown in Fig. 2.

Figure 3:
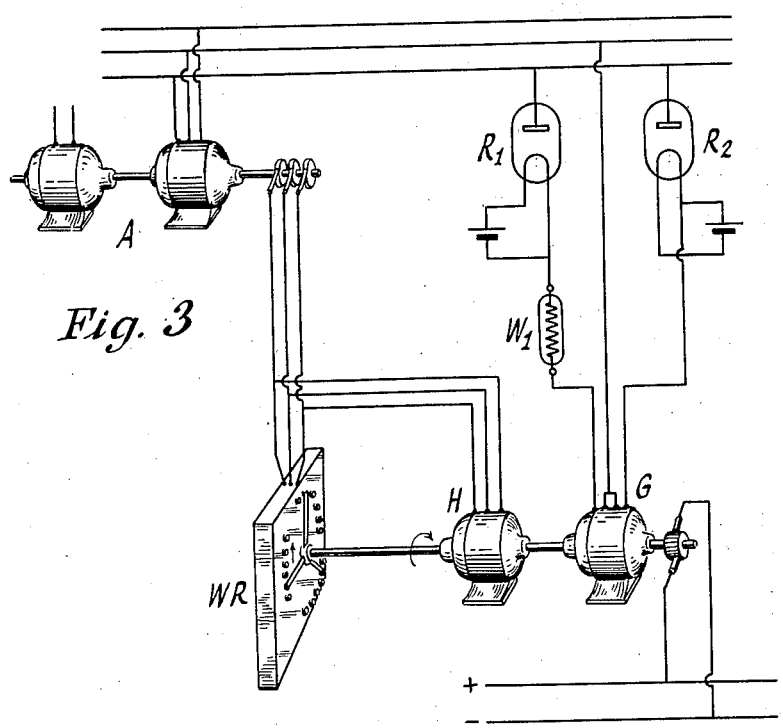
Figure 3 shows a device somewhat similar to Figure 1 except the counter rotative moment is obtained electrically.

In order also to compensate directly for the fluctuations of the input voltage an additional rotative moment acting upon the shaft of the auxiliary asynchronous motor H may be employed according to Fig. 3, being solely dependent on the voltage fluctuations but not on the frequency. This may be done by a small direct current motor G, the armature of which is supplied with constant direct current voltage and which contains two opposedly connected exciting windings. The one winding is fed by the three phase current system directly through a rectifier tube $R_2$ and the second across an equivalent tube $R_1$ and an iron resistance $W_1$ adjusting to a constant current. The field obtained by both windings is then proportional to the voltage, and the torque produced by the motor is proportional to the supply voltage, and varies directly with variation in the supply voltage. If the motor arrangement is used as a relay, an electromagnet E may be employed as shown in Figure 2 acting upon the arm of lever A' fastened on the shaft of the auxiliary motor. The slip rings shown on the left of the auxiliary motor H, Fig. 2, serve the purpose of supplying the direct current motor $G^2$ from the direct current network with exciting current by way of the switch A'. As is evident from Fig. 2, when the switch A' is in one extreme position, the exciting current in motor $G^2$ will be in one direction and when in the other extreme position the exciting current will be reversed. Motor $G^2$ controls the resistance device $WR_1$ in either direction, motor $G^1$ supplying the counter acting force at the proper time.

This electromagnet has two windings acting in opposite sense which, as above described, are fed by the three phase current system across the rectifier tubes $R_1$ and $R_2$. In every case the additional rotative moment generated by the voltage fluctuations must be such that it opposes the auxiliary asynchronous motor H when the voltage of the system decreases and that it assists the auxiliary motor when the voltage increases, because a decrease of the voltage requires a diminution of the resistance and an increase of the voltage an increase of the resistance, whilst the rotative moment of the motor has the tendency to enlarge the resistance.

Finally, if only fluctations of the voltage are presumed the auxiliary asynchronous motor can be left out, so that only a regulation of voltage alterations is employed.

As before stated, the rhythmical alterations of the load on the high frequency generator caused by the transmission of wireless signals which influence the speed of the machine may be compensated for by alternately short circuiting and including resistances in the rotor circuit of the motor in the rhythm of said signals by means of suitable relays controlled by the sending key. This is well known in the art and since it forms no part of this invention, need not be further discussed here.

Fig. 3 shows an example of another embodiment of my invention in which only one regulator WR is used, being fastened on the common shaft of the auxiliary asynchronous motor and of a small direct current motor G. The other reference signs of this figure agree with those of Fig. 1, and 2. The restoring movement in this embodiment may be similar to the device F and 1 shown in connection with Fig. 1.

In summing up:

The operation of the device shown in Fig. 1 has been hereinbefore explained.

Fig. 3 is similar to Fig. 1 except that the restoring device has been omitted because this is clearly shown in Fig. 1 and excepting the fact that the additional governing devices G, $R_1$, and $R_2$ have been shown. The operation of this device has also been hereinbefore included.

The device shown in Fig. 2 operates as follows:

Upon the occurrence of a certain change in the frequency in the power supply system, a change in torque as before explained takes place in motor H. This will cause the shaft of motor H to turn or to exert a force in a certain direction, say in a clockwise direction as viewed from the right, which necessarily causes lower back contact and upper front contact of switch A' to complete an exciting circuit of motor $G^2$, thus causing the shaft of motor $G^2$ to turn say clockwise, which in turn controls the resistance device $WR_1$ so as to place some resistance in the rotor circuit of motor A thereby compensating for the change in the said frequency. But upon the turning of the shaft of the motor $G^2$ clockwise, certain resistance is removed in the exciting circuit of direct current motor $G^1$, thru the resistance device $WR_2$ thereby causing greater excitation in the field of $G^1$, whereby a counter acting force is caused on the shaft of motor H, that is motor $G^1$ tends to turn the shaft opposite in direction to motor H. Whichever of these forces predominates of course determines the movement of said shaft, and consequently the direction of said field in motor $G^2$ through A'. Now let us suppose the voltage in the line changed, the rectified current through $R_2$ tends to remain constant due to resistance W, but the current in $R_1$ would increase or decrease depending on whether the voltage increased or decreased. If the voltage increases from normal the $R_1$ winding of E predominates. If the voltage decreases of course the $R_2$ winding of E would predominate and therefore the necessary torque would be exerted on the shaft connected to A'. Of course it must be clearly understood that I have described changes of the frequency in only one direction. Changes in the other direction would simply reverse the force produced in the respective shaft with the accompanying changes in resistances.

Summing up the operation of the device, we get: on an increase in frequency of the power line, there is caused an increase in slip in motor A, therefore greater torque (clock-wise) in H. Switch A' is down in back and up in front, therefore the field in $G^2$ is in a direction to turn the shaft of $G^2$ clock-wise and insert resistance $WR_1$ in rotor circuit of A, but turning shaft of $G^2$, takes out some resistance $WR_2$ from exciting field circuit of motor $G^1$, therefore $G^1$, tends to turn shaft of motor H counter clock-wise, until a balance takes place. A decrease in frequency of power line causes decrease in slip in motor A and therefore less torque clock-wise in motor H. $G^1$ therefore predominates and switch A' is up in back and down in front, whereby field in $G^2$ runs in opposite direction than in the above case, thus causing shaft of $G^2$ to turn counter clock-wise which takes out some resistance, but this inserts resistance $WR_2$ in exciting circuit of $G^2$, thereby lessening its torque, until a balance takes place. Now suppose the power line voltage increases, then the winding E of $R_1$ predominates, therefore turning shaft of H clock-wise causing an increase in resistance in rotor circuit of A; if the voltage decreases, then winding E of $R_2$ predominates whereby shaft of H is turned counter-clock-wise, causing a decrease in resistance in rotor circuit of A. The arrows shown in the drawing indicate the torque occurring in the different portions for the case when the frequency of the power line increases. Upon a decrease in said frequency the torque occurring in the different shafts would be in an opposite direction. This particular method has been taken only for purposes of more clearly describing the invention and not for limiting purposes.

While I have shown but three embodiments of my invention, other modifications thereof are readily possible and might readily suggest themselves to persons skilled in the art.

Having described my invention, what I claim is:

1. The combination with an asynchronous alternating current motor having a wound rotor, of a regulator system comprising, a regulating resistance connected to said rotor, an auxiliary motor supplied from the rotor circuit thereof and adapted to vary said regulating resistance according to changes in the frequency therein, and means responsive to change in voltage of current supply to said motor for simultaneously adjusting said regulating resistance.

2. A speed regulating system for asynchronous motors comprising means for conducting rotor currents therefrom to an external circuit, adjustable resistances connected in said external circuit, and means for adjusting said resistances comprising means for producing a torque proportional to the frequency in said rotor circuit, means for producing a steady opposing torque, and means also acting upon said resistance for compensating for supply voltage changes.

3. A speed regulating system for asynchronous motors comprising means for conducting rotor currents therefrom to an external circuit, adjustable resistances connected to said circuit, and means for adjusting said resistances, comprising means for producing a torque proportional to the frequency in said rotor circuit, means for producing a steady opposing torque, and means for compensating for supply voltage changes, comprising a second torque producing means cooperating to adjust said resistances and supplied from power lines to said motor.

4. A speed regulating system for asynchronous motors comprising means for conducting rotor currents therefrom to an external circuit, adjustable resistances connected to said circuit, and means for adjusting said resistances comprising means for producing a torque proportional to the frequency in said rotor circuit, means for producing a steady opposing torque, and means for compensating for supply voltage changes, comprising a second torque producing means cooperating to adjust said resistances and supplied from power lines to said motor, through a plurality of rectifier devices, one thereof comprising means for producing a constant current regardless of voltage changes and the other thereof comprising means for producing a current varying in accordance with voltage changes.

5. A speed regulating system for asynchronous motors comprising means for conducting rotor currents therefrom to an external circuit, adjustable resistances connected therein, and means for adjusting said resistances, comprising means for producing a torque proportional to the frequency in said rotor circuit, means for producing a steady opposing torque, and means for compensating for supply voltage changes, comprising a second torque producing means cooperating to adjust said resistances and supplied from power lines through a plurality of rectifier devices, one thereof comprising means for producing a constant current regardless of voltage changes, and the other thereof, means for producing a current varying in accordance with voltage changes, said resistance adjusting means comprising an auxiliary driving motor cooperating with with said resistances and controlled by said torque producing devices.

6. The combination with an asynchronous alternating current motor having a wound rotor circuit, of a regulating impedance connected to said rotor circuit, an auxiliary motor supplied from the rotor circuit thereof and adapted to vary said regulating impedance according to changes in the frequency therein, and a second auxiliary motor supplied in parallel to said motor and adapted to produce a torque in opposition to said first auxiliary motor.

7. The combination with an asynchronous alternating current motor having a wound rotor circuit, of a regulating impedance connected thereto, an auxiliary motor supplied from the rotor circuit thereof and adapted to vary said regulating impedance according to deviations in the frequency therein, and a second auxiliary motor supplied in parallel to said motor and adapted to produce a torque in opposition to said first auxiliary motor, and means interposed between said second auxiliary motor and its energy supply for causing the torque to vary in accordance with voltage changes therein.

Dr. OTTO BÖHM.